(12) United States Patent
Sato et al.

(10) Patent No.: US 10,003,151 B1
(45) Date of Patent: Jun. 19, 2018

(54) CONDUCTOR MODULE

(71) Applicant: Yazaki Corporation, Tokyo (JP)

(72) Inventors: Katsunori Sato, Shizuoka (JP); Takuto Goto, Shizuoka (JP); Shinichi Yanagihara, Shizuoka (JP); Yoshiaki Ichikawa, Shizuoka (JP); Takao Shoji, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/725,483

(22) Filed: Oct. 5, 2017

(30) Foreign Application Priority Data

Dec. 19, 2016 (JP) .................................. 2016-245832

(51) Int. Cl.
  *H01R 12/00* (2006.01)
  *H01R 13/405* (2006.01)
  *H01R 11/12* (2006.01)

(52) U.S. Cl.
  CPC ........... *H01R 13/405* (2013.01); *H01R 11/12* (2013.01)

(58) Field of Classification Search
  CPC .............. H01R 2201/26; H01R 23/725; H01R 9/2458; H01R 31/00
  USPC ............... 439/76.2, 621, 622, 682, 949, 723
  See application file for complete search history.

(56) References Cited

U.S. PATENT DOCUMENTS

| 9,660,243 B2* | 5/2017 | Nakayama .......... H01M 2/1077 |
| 2009/0269985 A1* | 10/2009 | Stadler ................. H01R 9/2458 |
| | | 439/629 |
| 2015/0093930 A1* | 4/2015 | Ishikawa ................ H01R 4/302 |
| | | 439/357 |

FOREIGN PATENT DOCUMENTS

JP           5223607 B2     6/2013

* cited by examiner

*Primary Examiner* — Phuong Chi T Nguyen
(74) *Attorney, Agent, or Firm* — Kenealy Vaidya LLP (57) ABSTRACT

A conductor module includes a busbar, an accommodation case, and a fixing member. The accommodation case has two or more fixing holes that pass through a fixing body first surface and a fixing body second surface. The fixing member includes a main body and fixing legs. The fixing legs are associated with the respective fixing holes, and have a part of the busbar interposed therebetween. The fixing legs are capable of plastic deformation by external force, are inserted in the respective fixing holes from a side of the fixing body first surface to protrude from a side of the fixing body second surface, and, under a fixed condition in which the busbar is fixed to the accommodation case by the fixing member, have leading ends disposed on an outside in a radial direction with respect to the fixing holes as viewed in an axial direction of the fixing holes.

4 Claims, 4 Drawing Sheets

CONDUCTOR MODULE

CROSS-REFERENCE TO RELATED APPLICATION(S)

The present application claims priority to and incorporates by reference the entire contents of Japanese Patent Application No. 2016-245832 filed in Japan on Dec. 19, 2016.

BACKGROUND OF THE INVENTION

1. Field of the Invention

The present invention relates to a conductor module.

2. Description of the Related Art

A conventional conductor module is applied to a battery module including a plurality of battery cells. The conductor module exemplarily includes a plurality of busbars and a status detector. The busbar is electrically connected with one of two electrode terminals of a battery cell and with electrode terminals of two battery cells that are adjacent to each other. The status detector includes a detection conductor to detect voltage of each battery cell (see, for example, Japanese Patent No. 5223607).

The conductor module further includes a connection part that electrically connects each busbar with the detection conductor through, for example, soldering or welding of the detection conductor to the busbar on which the detection conductor is disposed. In some conductor modules, the busbar with which the detection conductor is connected is accommodated in an accommodation space defined in an accommodation case before being connected with the electrode terminal.

When the busbar is to be fixed in the accommodation case, a locking portion for locking the busbar is formed in a wall portion that defines the accommodation space in order to restrict the busbar from moving with respect to the accommodation case in a direction opposite to a direction in which the busbar is inserted into the accommodation space. Because the locking portion is elastically deformed when the busbar is inserted, the locking portion is extended in the direction in which the busbar is inserted to thereby make the locking portion elastically deformable. The foregoing necessity requires a length in the insertion direction, specifically, height of the accommodation case in order for the locking portion for locking the busbar to be formed. Specifically, the fixing of the busbar in the accommodation case has been a hindrance to reduction in height of the accommodation case.

SUMMARY OF THE INVENTION

The present invention has been made in view of the foregoing situation and it is an object of the present invention to provide a conductor module capable of accomplishing miniaturization of a fixing body that fixes a connection conductor.

In order to achieve the above mentioned object, a conductor module according to one aspect of the present invention includes at least one connection conductor to be connected electrically with a connection target, a fixing body to which the at least one connection conductor is fixed, and a fixing member that fixes each of the at least one connection conductor to the fixing body, wherein the fixing body has two or more fixing holes that pass through a fixing body first surface and a fixing body second surface opposite to the fixing body first surface, the fixing member includes a main body having an opposed surface that faces the fixing body first surface and that clamps, with the fixing body first surface, part of the at least one connection conductor disposed between the opposed surface and the fixing body first surface, and fixing legs that protrude from the opposed surface, that are associated with the respective fixing holes, and that have the part of the at least one connection conductor interposed between the fixing legs, and the fixing legs are capable of plastic deformation by an external force, are inserted in the respective fixing holes from a side of the fixing body first surface to protrude from a side of the fixing body second surface, and, under a fixed condition in which the at least one connection conductor is fixed to the fixing body by the fixing member, have leading ends disposed on an outside in a radial direction with respect to the fixing holes as viewed in an axial direction of the fixing holes.

According to another aspect of the present invention, in the conductor module, the at least one connection conductor may include at least one connection conductor having through holes that pass through a conductor first surface and a conductor second surface opposite to the conductor first surface and that are associated with the respective fixing holes, and the fixing legs are inserted in the through holes and the fixing holes under the fixed condition.

According to still another aspect of the present invention, in the conductor module, the at least one connection conductor may include a first connection conductor, and a second connection conductor different from the first connection conductor, and the second connection conductor is fixed, using the fixing member that fixes the first connection conductor, to the fixing body that is identical to the fixing body to which the first connection conductor is fixed.

According to still another aspect of the present invention, in the conductor module, the connection target may be a battery cell, and the conductor module may further include a status detector including a detection conductor that electrically connects the second connection conductor with a status detection unit that detects a status of the battery cell with which the second connection conductor is electrically connected.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

The following details a conductor module according to an embodiment. It is noted that the embodiment is not intended to limit the scope of the invention. The elements of the embodiment include elements that can be replaced by, and readily apparent to, those skilled in the art, or elements that are substantially identical.

EMBODIMENT

Figure 1:
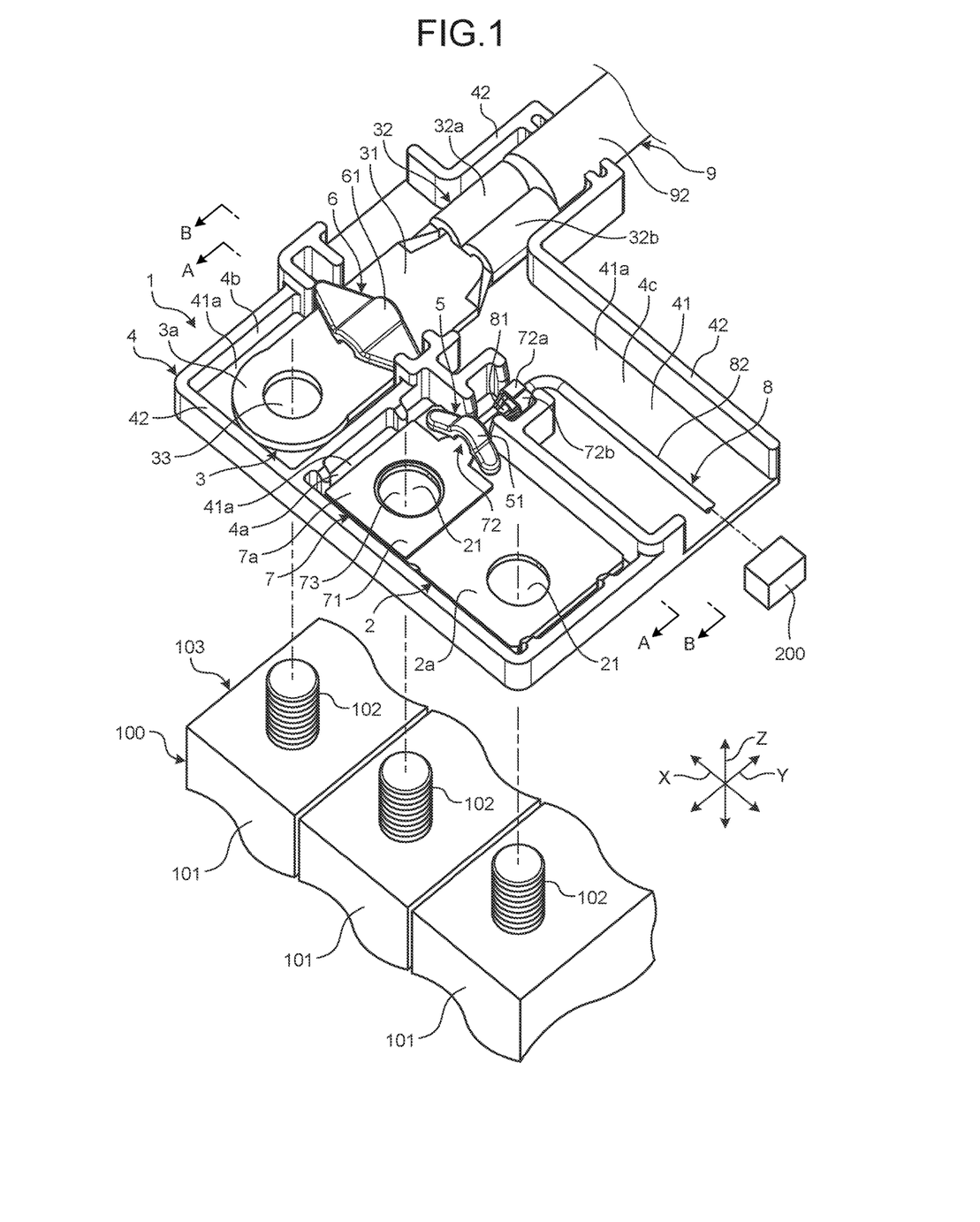
FIG. 1 is a perspective view of a conductor module in an embodiment.
Figure 2:
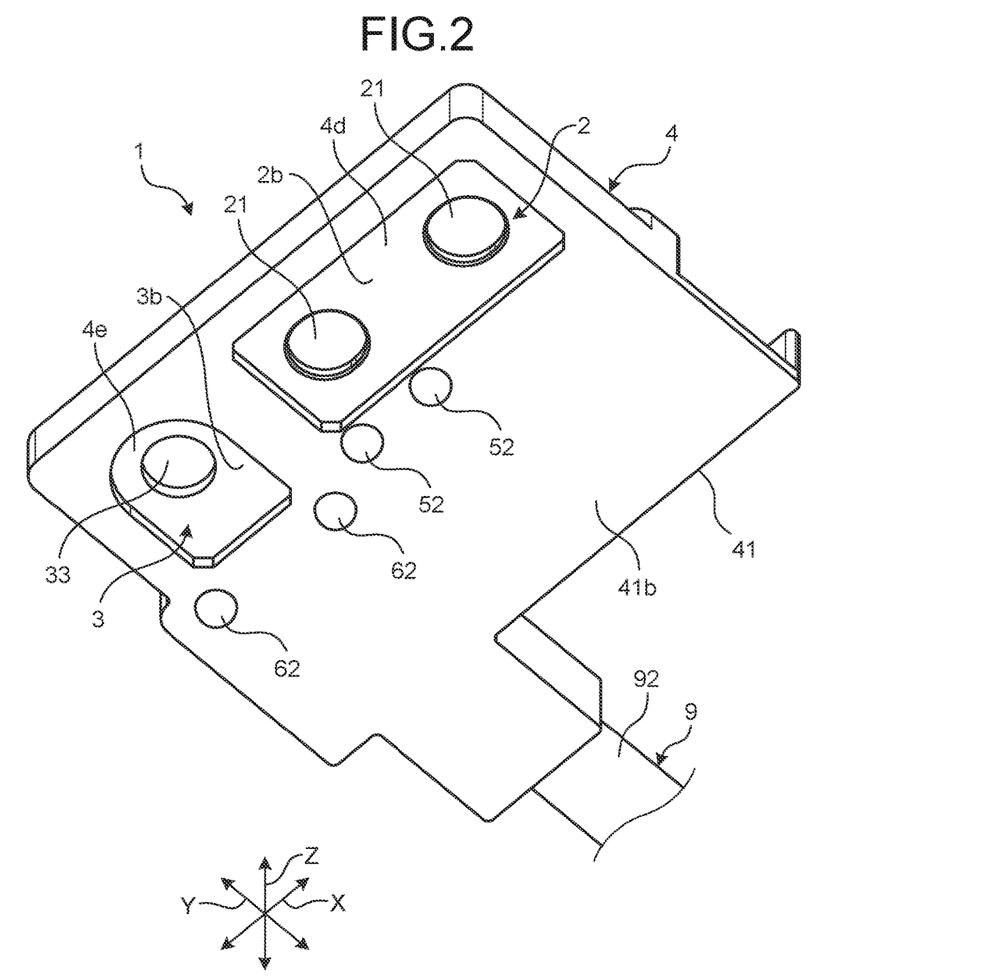
FIG. 2 is a perspective view of the conductor module in the embodiment.
Figure 3:
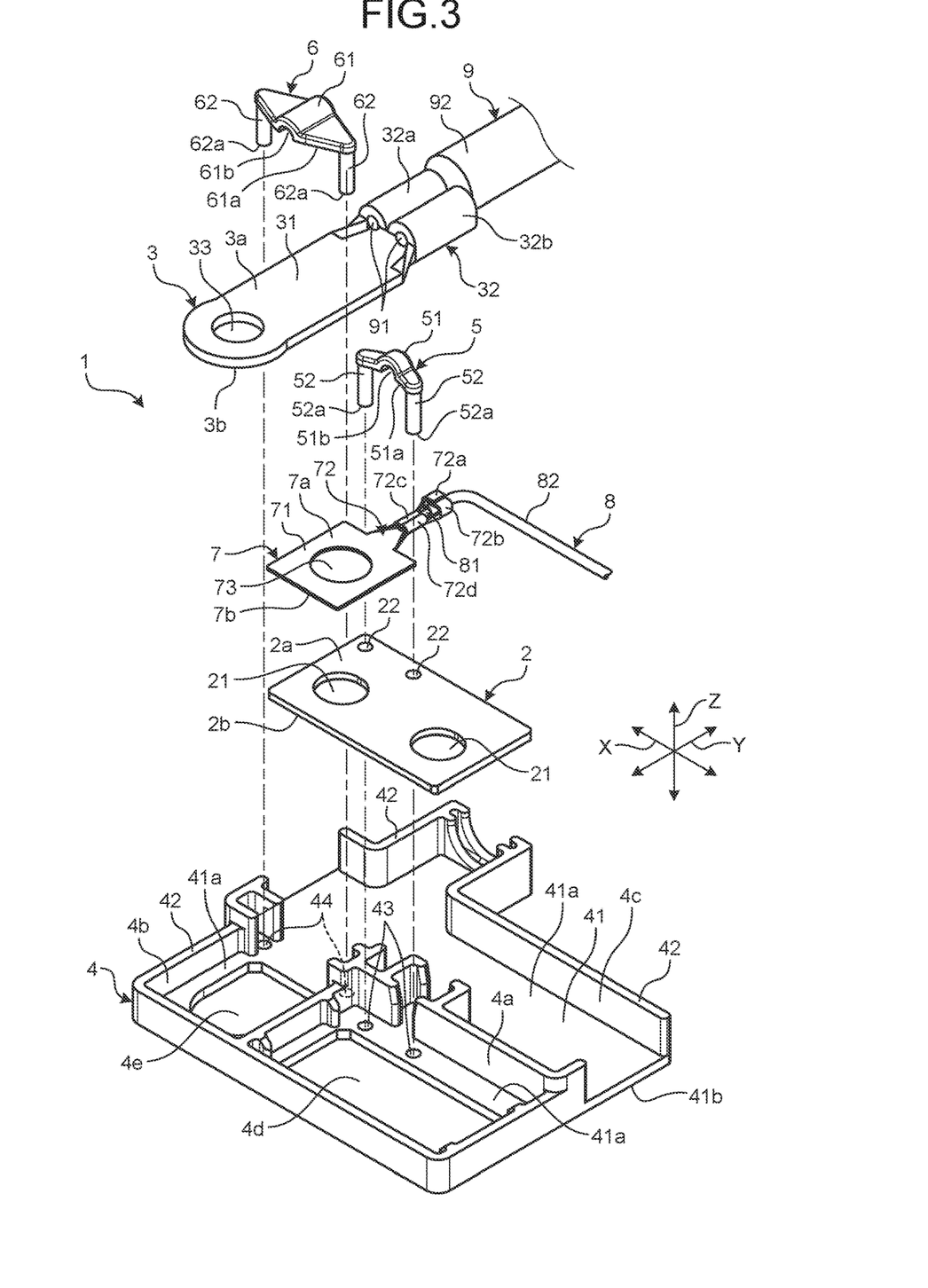
FIG. 3 is an exploded perspective view of the conductor module in the embodiment.
Figure 4:
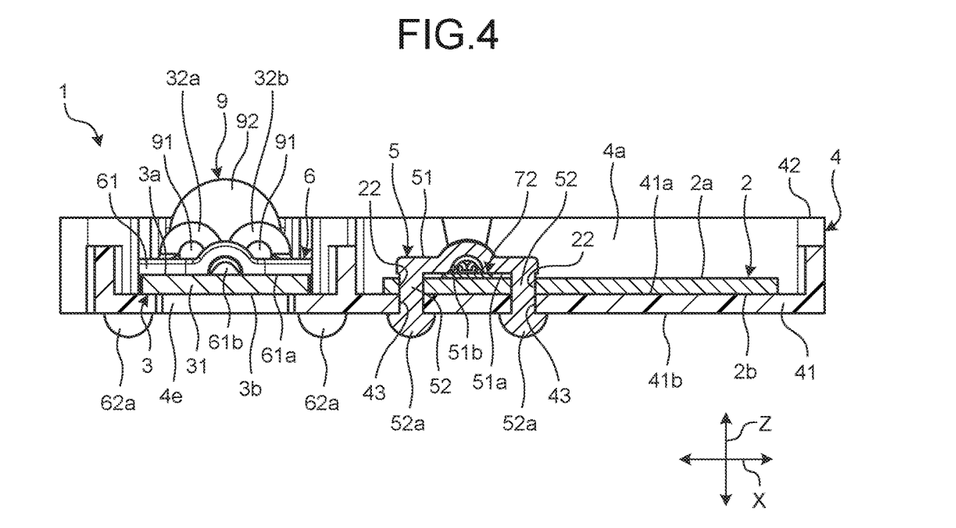
FIG. 4 is a cross-sectional view of the conductor module in the embodiment.
Figure 5:
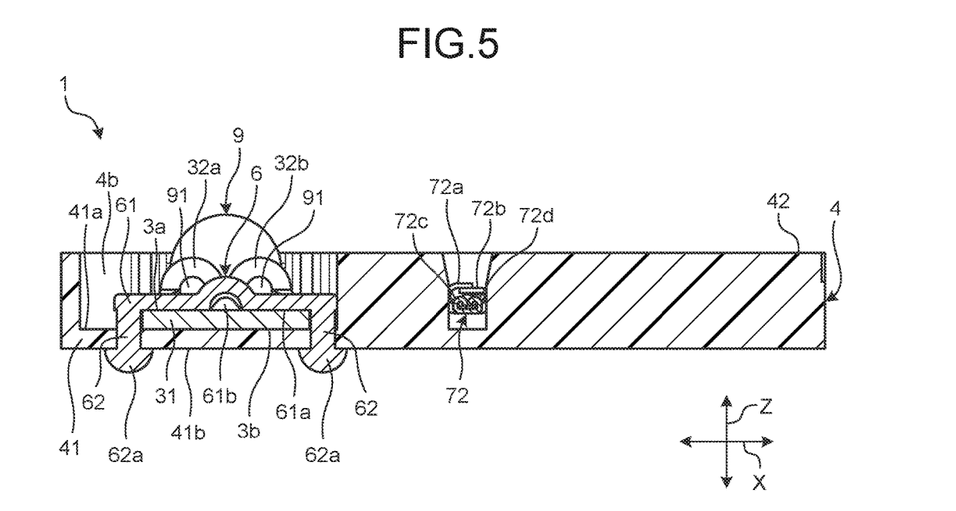
FIG. 5 is a cross-sectional view of the conductor module in the embodiment.

The following describes a conductor module according to an embodiment. FIG. 1 is a perspective view of the conductor module according to the embodiment. FIG. 2 is a perspective view of the conductor module in the embodiment. FIG. 3 is an exploded perspective view of the conductor module in the embodiment. FIG. 4 is a cross-sectional view of the conductor module in the embodiment. FIG. 5 is a cross-sectional view of the conductor module in the embodiment. It is here noted that FIG. 4 is a cross-sectional view taken along line A-A in FIG. 1 and FIG. 5 is a cross-sectional view taken along line B-B in FIG. 1. It should further be noted that, in each of the drawings, the X-direction extends in an array direction along which electrode terminals and connection conductors are arrayed in the embodiment. The Y-direction is a width direction of the conductor module in the embodiment and is orthogonal to the array direction. The Z-direction is a vertical direction in the conductor module and is orthogonal to the array direction and the width direction.

This conductor module 1 in the embodiment is to be assembled, as illustrated in FIG. 1, with a battery module 100. The battery module 100 has a modular configuration that includes, for example, a plurality of battery cells 101, such as secondary batteries, arrayed in the array direction. The battery module 100 is mounted on, for example, an electric vehicle (EV) or a hybrid vehicle (HV, PHV) and used for supplying an electric rotating machine as a drive source with electric power and storing (charging) the electric power generated by the electric rotating machine. The battery module 100, for example, includes a plurality of battery cells 101 connected in series with each other to thereby enable a high battery output corresponding with output requirements of the vehicle to be obtained. The battery cells 101 are composed of two rows of electrode terminal groups 103 that are spaced apart from each other in the width direction and that include electrode terminals 102 (a positive electrode terminal and a negative electrode terminal) disposed on respective ends in the width direction. The electrode terminal groups 103 are each composed of a plurality of electrode terminals 102 arrayed in the array direction in the battery module 100. In the battery module 100, one conductor module 1 is associated and assembled with each of the electrode terminal groups 103 and the conductor module 1 connects the electrode terminals 102 (the positive electrode terminals and the negative electrode terminals) of the battery cells 101 in series with each other. The battery cells 101 in the embodiment are disposed such that the electrode terminal 102 of a first battery cell 101 has polarity opposite to polarity of the electrode terminal 102 of a second battery cell 101 adjacent to the first battery cell 101 in the array direction. In addition, the two electrode terminal groups 103 are configured as follows. Specifically, in a first electrode terminal group 103, the electrode terminal 102 on a first end out of both ends in the array direction is defined as a terminating electrode terminal and, in a second electrode terminal group 103, the electrode terminal 102 on a second end out of both ends in the array direction is defined as a terminating electrode terminal having polarity opposite to polarity of the terminating electrode terminal of the first electrode terminal group 103. The two terminating electrode terminals are electrically connected with each other by, for example, an inverter. This establishes an electrical connection of the battery module 100 with an external device.

The conductor module 1 is to connect at least a plurality of battery cells 101 in series with each other. As illustrated in FIGS. 1 to 5, the conductor module 1 includes a busbar 2, a power cable terminal 3, an accommodation case 4, a fixing member 5, a fixing member 6, a detection terminal 7, a status detector 8, and a power cable 9. The conductor module 1 electrically connects the busbar 2, the power cable terminal 3, and the detection terminal 7 with the electrode terminal 102 as a connection target.

The busbar 2 is a connection conductor. As illustrated in FIGS. 1 to 5, the busbar 2 is electrically connected with a first one of the two electrode terminals 102 of the battery cell 101. In the embodiment, the busbar 2 constitutes a first connection conductor. The busbar 2 is directly and electrically connected with two electrode terminals 102 that are adjacent to each other in the array direction and that have polarities opposite to each other in the two battery cells 101 that are adjacent to each other in the array direction of the electrode terminal group 103 in one row. The busbar 2 is formed of an electrically conductive material, such as metal, into a flat plate shape. In the embodiment, the busbar 2 is formed into a rectangular plate shape having a longitudinal direction extending in the array direction as viewed in the vertical direction. The busbar 2 has terminal holes 21 and through holes 22.

The electrode terminals 102 are inserted in the terminal holes 21. The terminal holes 21 each pass through from a conductor first surface 2a to a conductor second surface 2b that are opposed to each other in the vertical direction. In the embodiment, the busbar 2 has two terminal holes 21 associated with respective two electrode terminals 102 that are to be connected with the busbar 2. The two terminal holes 21 are spaced apart from each other in the array direction. It is noted that the busbar 2 is fixed to the electrode terminals 102 as follows. Specifically, for example, under a condition in which the electrode terminals 102 are inserted in the terminal holes 21 in the busbar 2, nuts not illustrated are threadedly engaged with thread grooves in leading ends of the electrode terminals 102 protruding from the side of the conductor first surfaces 2a of the terminal holes 21.

Fixing legs 52 to be described later of the fixing member 5 are inserted in the through holes 22. The through holes 22 each pass through from the conductor first surface 2a to the conductor second surface 2b that are opposed to each other in the vertical direction. In the embodiment, the busbar 2 has two through holes 22 associated with respective two fixing holes 43 to be described later. The through holes 22 are spaced apart from each other in the array direction. It is noted that the two through holes 22 are formed across part of the detection terminal 7 disposed on the busbar 2 in the array direction. Additionally, the two through holes 22 are disposed, in the width direction, on the side closer to a third accommodation space 4c to be described later than the terminal holes 21 are.

The power cable terminal 3 is a connection conductor. As illustrated in FIGS. 1 to 5, the power cable terminal 3 is electrically connected with a first one of the two electrode terminals 102 of the battery cell 101. In the embodiment, the power cable terminal 3 constitutes a third connection conductor that is different from the busbar 2 as the first connection conductor and the detection terminal 7 as a second connection conductor. The power cable terminal 3 is directly and electrically connected with the terminating electrode terminal out of the electrode terminals 102 of the electrode terminal group 103. The power cable terminal 3 is formed of an electrically conductive material, such as metal, into a flat plate shape. In the embodiment, the power cable terminal 3 is formed into a rectangular plate shape having a longitudinal direction extending in the width direction as viewed in the vertical direction. The power cable terminal 3 is attached to a first end of the power cable 9. The power cable terminal 3 includes a contact portion 31 and a barrel portion 32 and has a terminal hole 33.

The contact portion 31 contacts the electrode terminal 102 as a terminating electrode terminal. The contact portion 31 has an end on the side adjacent to the power cable 9 in the width direction connected with the barrel portion 32. The terminal hole 33 is formed at a position near an end of the contact portion 31 opposite to the barrel portion 32.

The barrel portion 32 is directly and electrically connected with the power cable 9. The power cable 9 establishes an electrical connection between the battery module 100 and an external device. Power conductors 91 are electrically conductive and deformable. The power conductor 91 is composed of a plurality of wires formed of, for example, copper or aluminum, stranded together. An insulator 92 is electrically insulative and covers the power conductors 91. The insulator 92 is elastically deformable and formed of, for example, a synthetic resin. The barrel portion 32 includes crimped portions 32a and 32b that protrude from both ends in the width direction to a side opposite in the vertical direction to the side of a bottom plate 41 to be described later of the accommodation case 4. The barrel portion 32 is curved such that the crimped portions 32a and 32b have leading ends approaching each other to thereby crimp the power conductors 91 to the power cable terminal 3.

The terminal hole 33 receives the electrode terminal 102 as the terminating electrode terminal inserted therein. The terminal hole 33 passes through from a conductor first surface 3a to a conductor second surface 3b that are opposed to each other in the vertical direction. It is noted that the power cable terminal 3 is fixed to the electrode terminal 102 as follows. Specifically, for example, under a condition in which the electrode terminal 102 is inserted in the terminal hole 33 in the power cable terminal 3, a nut not illustrated is threadedly engaged with thread grooves in a leading end of the electrode terminal 102 protruding from the side of the conductor first surface 3a of the terminal hole 33.

The accommodation case 4 is a fixing body to which the busbar 2, the power cable terminal 3, and the detection terminal 7 are fixed as illustrated in FIGS. 1 to 5. Specifically, the busbar 2, the power cable terminal 3, and the detection terminal 7 are fixed to the same accommodation case 4 by the fixing members 5 and 6. The accommodation case 4 is electrically insulative and formed of, for example, a synthetic resin. The accommodation case 4 includes the bottom plate 41 and a frame plate 42 and has the fixing holes 43 and fixing holes 44.

The bottom plate 41 has a flat plate shape. The bottom plate 41 has a fixing body first surface 41a and a fixing body second surface 41b that are opposed to each other in the vertical direction. At least the busbar 2, the power cable terminal 3, and the detection terminal 7 are disposed on the fixing body first surface 41a.

The frame plate 42 defines a plurality of spaces in the accommodation case 4 and is erected from the fixing body first surface 41a of the bottom plate 41. In the embodiment, the frame plate 42 is formed mainly along an outer periphery of the bottom plate 41 to thereby define a first accommodation space 4a, a second accommodation space 4b, and the third accommodation space 4c in the accommodation case 4.

The first accommodation space 4a accommodates the busbar 2 and the detection terminal 7. The first accommodation space 4a has an opening 4d that passes through from the fixing body first surface 41a to the fixing body second surface 41b. It is noted that the opening 4d is formed so that the terminal holes 21 are exposed to the outside of the accommodation case 4 under a condition in which the busbar 2 is accommodated in the first accommodation space 4a. The second accommodation space 4b accommodates the power cable terminal 3 and is formed to be adjacent to the first accommodation space 4a in the array direction. The second accommodation space 4b has an opening 4e that passes through from the fixing body first surface 41a to the fixing body second surface 41b. The opening 4e is formed so that the terminal hole 33 is exposed to the outside of the accommodation case 4 under a condition in which the power cable terminal 3 is accommodated in the second accommodation space 4b. The third accommodation space 4c accommodates, for example, the status detector 8 and is formed to be adjacent to the first accommodation space 4a and the second accommodation space 4b in the width direction. In the embodiment, the third accommodation space 4c communicates with the first accommodation space 4a and the second accommodation space 4b in the width direction and communicates with the outside in the array direction.

The fixing legs 52 are to be inserted in the fixing holes 43. The fixing holes 43 pass through a portion constituting the first accommodation space 4a of the bottom plate 41 from the fixing body first surface 41a to the fixing body second surface 41b. In the embodiment, two fixing holes 43 are formed to be spaced apart in the array direction from each other in the first accommodation space 4a. It is here noted that the two fixing holes 43 are formed across part of the detection terminal 7 disposed on the busbar 2 in the array direction. Additionally, the two fixing holes 43 are disposed, in the width direction, on the side closer to the third accommodation space 4c than the opening 4d is.

Fixing legs 62 are to be inserted in the fixing holes 44. The fixing holes 44 pass through a portion constituting the second accommodation space 4b of the bottom plate 41 from the fixing body first surface 41a to the fixing body second surface 41b. In the embodiment, two fixing holes 44 are formed to be spaced apart in the array direction from each other in the second accommodation space 4b. It is here noted that the two fixing holes 44 are formed across part of the power cable terminal 3, specifically in the embodiment, the contact portion 31 in the array direction. Additionally, the two fixing holes 44 are disposed, in the width direction, on the side closer to the third accommodation space 4c than the opening 4e is.

As illustrated in FIGS. 1 to 5, the fixing member 5 integrally fixes the busbar 2 and the detection terminal 7 to the accommodation case 4. The fixing member 5 is thermoplastic and formed of, for example, a synthetic resin. Specifically, the fixing member 5 is capable of plastic deformation by being heated and subjected to external force acting thereon. The fixing member 5 includes a main body 51 and the fixing legs 52.

Part of the busbar 2 and the detection terminal 7 are sandwiched in the vertical direction between the main body 51 and the fixing body first surface 41a. The detection terminal 7 contacts the main body 51. In the embodiment, the main body 51 has a substantially flat plate shape having a longitudinal direction extending in the array direction when viewed in the vertical direction. The main body 51 is formed into an arcuate shape curved toward the side of the third accommodation space 4c in the width direction. The main body 51 has an opposed surface 51a that faces the conductor first surface 2a and a conductor first surface 7a to be described later. The opposed surface 51a is formed such that, under a fixed condition in which the fixing member 5 fixes the busbar 2 and the detection terminal 7 to the accommodation case 4, portions thereof between respective both ends and a center in the array direction are in contact with the conductor first surface 7a, resulting in the part of the busbar 2 and the detection terminal 7 being sandwiched between the opposed surface 51a and the fixing body first surface 41a. The main body 51 is formed to have the center in the array direction protruding toward a side opposite to the conductor first surface 7a in the vertical direction and is formed such that a portion of the opposed surface 51a facing the protruding portion in the vertical direction is spaced away from the conductor first surface 7a. Specifically, the main body 51 has a status detector inserting space 51b (hereinafter referred to simply as a "space 51b") defined by the opposed surface 51a and the conductor first surface 7a at the center in the array direction. The space 51b is formed into a substantially semi-arcuate shape as viewed in the width direction and communicates with the outside in the width direction. When viewed in the vertical direction, the main body 51 is formed to cover part of the detection terminal 7 via the busbar 2 disposed on the fixing body first surface 41a, specifically in the embodiment, part of a barrel portion 72 to be described later.

The fixing legs 52 are inserted in the fixing holes 43 and, under the fixed condition, are restricted from being pulled out of the fixing holes 43. The fixing legs 52 are formed to protrude from the opposed surface 51a of the main body 51 toward the side of the fixing body first surface 41a in the vertical direction. In the embodiment, two fixing legs 52 are formed to be associated with the respective fixing holes 43 in the accommodation case 4. The fixing legs 52 are formed to be spaced away from each other in the array direction. Under the fixed condition, part of the detection terminal 7 is disposed between the two fixing legs 52. The fixing legs 52 are inserted in the through holes 22 in the busbar 2 from the side of the conductor first surface 2a and further inserted in the fixing holes 43 from the side of the fixing body first surface 41a, to thereby have leading ends 52a protruding to the side of the fixing body second surface 41b. The fixing legs 52, before being fixed in place, specifically, before the external force acts thereon with heat being applied at the same time, are formed into cylindrical shapes including the leading ends 52a as illustrated in FIG. 3. The fixing legs 52 each have a length in the vertical direction set to be longer than a total depth in the vertical direction of the through holes 22 and the fixing holes 43. The fixing legs 52 are formed, under the fixed condition, so as to have the leading ends 52a disposed on the outside in a radial direction with respect to the fixing holes 43 when viewed in an axial direction of the fixing holes 43, specifically, when viewed in the vertical direction. In the embodiment, the fixing legs 52 are each formed such that, under the fixed condition, the leading end 52a is formed into a hemispherical shape having a circumference of a diameter greater than a diameter of the fixing hole 43 when viewed in the vertical direction as illustrated in FIG. 4. Specifically, each of the leading ends 52a is disposed, when viewed in the vertical direction, so as to surround the circumference of the fixing hole 43.

As illustrated in FIGS. 1 to 5, the fixing member 6 fixes the power cable terminal 3 to the accommodation case 4. The fixing member 6 is thermoplastic and is formed of, for example, a synthetic resin. Specifically, the fixing member 6 is capable of plastic deformation by being heated and subjected to external force acting thereon. The fixing member 6 includes a main body 61 and the fixing legs 62. The fixing member 6 has a basic configuration identical to a basic configuration of the fixing member 5.

Part of the power cable terminal 3 is sandwiched in the vertical direction between the main body 61 and the fixing body first surface 41a. The power cable terminal 3 contacts the main body 61. In the embodiment, the main body 61 has a substantially flat plate shape. When viewed in the vertical direction, the main body 61 has a substantially rhombic shape having a longitudinal direction extending in the array direction. The main body 61 has an opposed surface 61a that faces the conductor first surface 3a. The opposed surface 61a is formed such that, under a fixed condition in which the fixing member 6 fixes the power cable terminal 3 to the accommodation case 4, portions thereof near respective both ends in the array direction are in contact with the conductor first surface 3a, resulting in the part of the power cable terminal 3 being sandwiched between the opposed surface 61a and the fixing body first surface 41a. The main body 61 is formed to have a center in the array direction protruding toward a side opposite to the conductor first surface 3a in the vertical direction and is formed such that a portion of the opposed surface 61a facing the protruding portion in the vertical direction is spaced away from the conductor first surface 3a. Specifically, the main body 61 has a status detector inserting space 61b (hereinafter referred to simply as a "space 61b") defined by the opposed surface 61a and the conductor first surface 3a at the center in the array direction. The space 61b is formed into a substantially semi-arcuate shape as viewed in the width direction and communicates with the outside in the width direction. When viewed in the vertical direction, the main body 61 is formed to cover part of the contact portion 31 of the power cable terminal 3 disposed on the fixing body first surface 41a.

The fixing legs 62 are inserted in the fixing holes 44 and, under the fixed condition, are restricted from being pulled out of the fixing holes 44. The fixing legs 62 are formed to protrude from the opposed surface 61a of the main body 61 toward the side of the fixing body first surface 41a in the vertical direction. In the embodiment, two fixing legs 62 are formed to be associated with the respective fixing holes 44 in the accommodation case 4. The fixing legs 62 are formed to be spaced away from each other in the array direction. Under the fixed condition, part of the power cable terminal 3 is disposed between the two fixing legs 62. The fixing legs 62 are inserted in the fixing holes 44 from the side of the fixing body first surface 41a, to thereby have leading ends 62a protruding to the side of the fixing body second surface 41b. The fixing legs 62, before being fixed in place, specifically, before the external force acts thereon with heat being applied at the same time, are formed into cylindrical shapes including the leading ends 62a as illustrated in FIG. 3. The fixing legs 62 each have a length in the vertical direction set to be longer than a depth in the vertical direction of the fixing holes 44. The fixing legs 62 are formed, under the fixed condition, so as to have the leading ends 62a disposed on the outside in a radial direction with respect to the fixing holes 44 when viewed in an axial direction of the fixing holes 44, specifically, when viewed in the vertical direction. In the embodiment, the fixing legs 62 are each formed such that, under the fixed condition, the leading end 62a is formed into a hemispherical shape having a circumference of a diameter greater than a diameter of the fixing hole 44 when viewed in the vertical direction as illustrated in FIG. 5. Specifically, each of the leading ends 62a is disposed, when viewed in the vertical direction, so as to surround the circumference of the fixing hole 44.

The detection terminal 7 is a connection conductor. As illustrated in FIGS. 1 to 5, the detection terminal 7 is electrically connected with one of the two electrode terminals 102 of the battery cell 101. In the embodiment, the detection terminal 7 is a second connection conductor different from the busbar 2 as the first connection conductor. The detection terminal 7 is directly and electrically connected with one of the two electrode terminals 102 with which the busbar 2 is directly and electrically connected. The detection terminal 7 is formed of an electrically conductive material, such as metal, into a flat plate shape. In the embodiment, the detection terminal 7 is formed, when viewed in the vertical direction, into a plate shape having a longitudinal direction extending in the width direction and having a width in the array direction narrower on the side of the third accommodation space 4c than on the side of the first accommodation space 4a. The detection terminal 7 is attached with a first end of the status detector 8 and includes a contact portion 71 and the barrel portion 72 and has a terminal hole 73.

The contact portion 71 contacts the electrode terminal 102. The contact portion 71 has a first end in the width direction on the side of the power cable 9 connected with the barrel portion 72. The terminal hole 73 is formed at a position near a second end opposite to the first end.

The barrel portion 72 is directly and electrically connected with the status detector 8. The barrel portion 72 includes a pair of insulator crimping portions 72a and 72b and a pair of conductor crimping portions 72c and 72d, the pairs formed on respective ends in the width direction. The pair of insulator crimping portions 72a and 72b and the pair of conductor crimping portions 72c and 72d protrude to the side opposite to the bottom plate 41 in the vertical direction. The pair of insulator crimping portions 72a and 72b is formed on the side closer to the third accommodation space 4c in the width direction with respect to the pair of conductor crimping portions 72c and 72d. In the barrel portion 72, the insulator crimping portions 72a and 72b have leading ends curved to approach each other to thereby crimp an insulator 82 to be described later of the status detector 8 onto the detection terminal 7 and the conductor crimping portions 72c and 72d have leading ends curved to approach each other to thereby crimp a detection conductor 81 to be described later of the status detector 8 onto the detection terminal 7.

The terminal hole 73 receives the electrode terminal 102 as a terminating electrode terminal inserted therein. The terminal hole 73 passes through from the conductor first surface 7a to a conductor second surface 7b that are opposed to each other in the vertical direction. It is noted that the detection terminal 7 is fixed to the electrode terminal 102 together with the busbar 2 as follows. Specifically, for example, under a condition in which the electrode terminal 102 is inserted in the terminal hole 73, a nut not illustrated is threadedly engaged with thread grooves in the leading end of the electrode terminal 102 protruding from the side of the conductor first surface 7a of the terminal hole 73.

The status detector 8 electrically connects the electrode terminal 102 with a battery module monitoring unit 200 via the detection terminal 7 as illustrated in FIGS. 1 to 5. Specifically, the conductor module 1 detects via the status detector 8 a status of the battery cell 101 connected with the detection terminal 7, specifically in the embodiment, voltage information and outputs the voltage information to the battery module monitoring unit 200. The battery module monitoring unit 200 represents a status detection device detecting the status of each battery cell 101. The battery module monitoring unit 200, for example, monitors the status of each battery cell 101 using the voltage information and notifies an operator who detects a fault in the battery cell 101 of a fault. Additionally, the battery module monitoring unit 200 can output the acquired voltage information to a battery ECU that controls the battery module 100. The battery ECU performs charge and discharge control of the battery module 100 on the basis of the voltage information. The status detector 8 includes the detection conductor 81 and the insulator 82. In the embodiment, the status detector 8 is a wire corresponding to the busbar 2 and is integrally molded so as to cover the detection conductor 81 in the insulator 82.

The detection conductor 81 electrically connects the detection terminal 7 with the battery module monitoring unit 200. The detection conductor 81 is electrically conductive and deformable and is composed of a plurality of wires formed of, for example, copper or aluminum, stranded together. The detection conductor 81 has a first end directly and electrically connected with the conductor first surface 7a and a second end electrically connected with the battery module monitoring unit 200 via a connector not illustrated. Part of the insulator 82 covering the first end of the detection conductor 81 is peeled off in advance to cause the first end of the detection conductor 81 to be exposed to the outside from a leading end of the insulator 82.

The insulator 82 covers the detection conductor 81. The insulator 82 is electrically insulative and elastically deformable. The insulator 82 is formed of, for example, a synthetic resin. The insulator 82 is formed to extend in the array direction. The insulator 82 is bent from the array direction in the width direction and disposed on the conductor first surface 7a.

The following describes an assembly procedure for the conductor module 1. It is noted that the following assembly procedure assumes that the power cable 9 is electrically connected with the power cable terminal 3 in advance and that the detection terminal 7 is electrically connected with the status detector 8 in advance. As illustrated in FIG. 3, an assembly operator first disposes the busbar 2 with respect to the accommodation case 4 such that the conductor second surface 2b faces the fixing body first surface 41a in the first accommodation space 4a and such that the through holes 22 in the busbar 2 are aligned with the respective fixing holes 43 in the vertical direction. The assembly operator brings the busbar 2 near to the accommodation case 4, causing the conductor second surface 2b to be in contact with the fixing body first surface 41a. At this time, the through holes 22 communicate with the respective fixing holes 43. The assembly operator next places the detection terminal 7 on the conductor first surface 2a of the busbar 2 so that part of the detection terminal 7 is disposed between the through holes 22. At this time, the detection terminal 7 is accommodated in the first accommodation space 4a and the status detector 8 is accommodated in the third accommodation space 4c. The assembly operator then disposes the fixing member 5 with respect to the busbar 2 such that the opposed surface 51a faces the conductor first surface 2a and such that the fixing legs 52 of the fixing member 5 are aligned with the respective through holes 22 in the busbar 2 in the vertical direction. At this time, the conductor first surface 7a of the detection terminal 7 placed on the conductor first surface 2a of the busbar 2 faces the opposed surface 51a. The assembly operator then brings the fixing member 5 close to the busbar 2 in the vertical direction. At this time, the fixing legs 52 are inserted in the respective through holes 22 from the conductor first surface 2a side and into the respective fixing holes 43, thus protruding from the fixing body second surface 41b side. Additionally, the main body 51 contacts the detection terminal 7 under a condition in which the main body 51 presses the detection terminal 7 and the busbar 2 against the fixing body first surface 41a. Next, the power cable terminal 3 and the accommodation case 4 are disposed such that the power cable terminal 3 is disposed between the fixing holes 44 and such that the conductor second surface 3b faces the fixing body first surface 41a in the second accommodation space 4b. Next, the assembly operator brings the power cable terminal 3 close to the accommodation case 4 so that the conductor second surface 3b contacts the fixing body first surface 41a. Then, the assembly operator disposes the fixing member 6 with respect to the accommodation case 4 such that the opposed surface 61a faces the fixing body first surface 41a and such that the fixing legs 62 of the fixing member 6 are aligned with the respective fixing holes 44 in the vertical direction. Then, the assembly operator brings the fixing member 6 close to the accommodation case 4 in the vertical direction. At this time, the fixing legs 62 are inserted in the respective fixing holes 44 from the fixing body first surface 41a side and protrude from the fixing body second surface 41b side. Additionally, the main body 61 contacts the power cable terminal 3 under a condition in which the main body 61 presses the power cable terminal 3 against the fixing body first surface 41a. Then, the assembly operator applies external force toward the accommodation case 4 side in the vertical direction, while heating the fixing legs 52 and 62 protruding from the fixing body second surface 41b of the accommodation case 4. For example, under a condition in which a mold having formed therein in advance a transfer surface identical to shapes of the leading ends 52a and 62a under the fixed condition is heated, the assembly operator presses the leading ends 52a and 62a before the fixed condition toward the accommodation case 4 side in the vertical direction. The foregoing step causes the leading ends 52a and 62a of the fixing legs 52 and 62 to be elastically deformed so as to surround the circumferences of the fixing holes 43 and 44. When cooled thereafter, the leading ends 52a and 62a maintain the deformed conditions at room temperature. The electrode terminals 102 are then inserted in the terminal holes, 21, 33, and 73 exposed outside the accommodation case 4 through the openings 4d, 4e, and are electrically connected with the busbar 2, the power cable terminal 3, and the detection terminal 7, respectively, to thereby assemble the conductor module 1 with the battery module 100. This completes the assembly of the conductor module 1 and the fixed condition is achieved in which the busbar 2, the power cable terminal 3, and the detection terminal 7 are fixed to the accommodation case 4 by the fixing members 5 and 6.

As described above, the conductor module 1 in the embodiment incorporates the fixing members 5 and 6 to fix the busbar 2, the power cable terminal 3, and the detection terminal 7 to the accommodation case 4 under the fixed condition. Specifically, the conductor module 1 fixes the busbar 2, the power cable terminal 3, and the detection terminal 7 to the accommodation case 4 using another element instead of the accommodation case 4. Thus, when the busbar 2, the power cable terminal 3, and the detection terminal 7 are to be fixed by the accommodation case 4, the accommodation case 4 does not require a function to fix the busbar 2, the power cable terminal 3, and the detection terminal 7. Thus, the conductor module 1 is required only to form, in the accommodation case 4, a space (the first accommodation space 4a and the second accommodation space 4b) having a total length in the vertical direction of the connection conductors (the busbar 2, the power cable terminal 3, and the detection terminal 7) and the fixing members 5 and 6, so that reduction in height of the accommodation case 4 can be promoted. The foregoing feature enables the conductor module 1 to achieve reduction in size.

In the conductor module 1 in the embodiment, the busbar 2 is fixed by the fixing member 5 to the accommodation case 4 under a condition in which the fixing legs 52 are inserted in the respective through holes 22 in the busbar 2. Thus, the conductor module 1 enables the busbar 2 to be reliably fixed to the accommodation case 4, compared with a case in which the busbar 2 is fixed to the accommodation case 4 by the fixing member 5 through part of the busbar 2 being simply sandwiched between the fixing legs 52. In addition, the busbar 2 can be restricted from moving relative to the accommodation case 4 in the array direction and the width direction, so that the busbar 2 can be reliably positioned with respect to the accommodation case 4.

In the conductor module 1 in the embodiment, the busbar 2 and the detection terminal 7 are simultaneously fixed to the accommodation case 4 by the fixing member 5. Thus, the conductor module 1 enables a plurality of different connection conductors laminated one on top of another to be fixed to the accommodation case 4 by a single fixing member 5. Thus, the conductor module 1 enables a greater number of connection conductors 2, 3, and 7 to be fixed to the accommodation case 4 by a smaller number of fixing members 5 and 6.

In the conductor module 1 in the embodiment, the busbar 2 and the detection terminal 7 to be fixed to a single electrode terminal 102 are fixed to the accommodation case 4 by a single fixing member 5. This arrangement enables the busbar 2 and the detection terminal 7 fixed to the accommodation case 4 to establish an electrical connection with an adjacent electrode terminal 102 and to establish an electrical connection between the electrode terminal 102 and the battery module monitoring unit 200.

The conductor module 1 in the embodiment has been described for a case in which one set of the busbar 2 and the detection terminal 7 is accommodated in the accommodation case 4. The case is nonetheless illustrative only and not limiting. The accommodation case 4 may include a plurality of first accommodation spaces 4a defined therein and arrayed in the array direction. Each of the first accommodation spaces 4a then may accommodate a busbar 2 and a detection terminal 7, and the busbar 2 and the detection terminal 7 may then be fixed to the accommodation case 4 by the fixing member 5.

The conductor module 1 in the embodiment has been described for a case in which the busbar 2 and the detection terminal 7 are fixed to the accommodation case 4 by the fixing member 5. The case is nonetheless illustrative only and not limiting. The first accommodation space 4a may accommodate only the busbar 2, and only the busbar 2 may then be fixed to the accommodation case 4 by the fixing member 5. In this case, the opposed surface 51a of the fixing member 5 contacts the conductor first surface 2a of the busbar 2.

In the conductor module 1 in the embodiment, the fixing members 5 and 6 have been each described to be formed of a synthetic resin capable of plastic deformation by external force. The material is nonetheless illustrative only and not limiting. Metal capable of plastic deformation, such as aluminum or iron having electrical conductivity, may be used to form the fixing members 5 and 6. In this case, the fixing legs 52 and 62 are each bent in directions to approach each other as viewed in the width direction under the fixed condition, to thereby contact the fixing body second surface 41b. Specifically, the fixing legs 52 and 62 may have the respective leading ends 52a and 62a bent inwardly.

In the conductor module 1 in the embodiment, the accommodation case 4 has been described as the fixing body. The arrangement is, however, illustrative only and not limiting, and a flexible flat cable (FFC) or a flexible printed wiring board (FPC) may be used.

The conductor module in the aspect of the present embodiment includes the fixing member to fix the connection conductor to the fixing body. Thus, the fixing body does not require a function to fix the busbar. The aspect of the present embodiment can thus achieve an effect of promoting reduction in size.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductor module, comprising:
    at least one connection conductor configured to be connected electrically with a connection target;
    a fixing body to which the at least one connection conductor is fixed; and
    a fixing member that fixes each of the at least one connection conductor to the fixing body, wherein
    the fixing body has two or more fixing holes that pass through a fixing body first surface and a fixing body second surface opposite to the fixing body first surface,
    the fixing member includes:
        a main body having an opposed surface that faces the fixing body first surface and that clamps, with the fixing body first surface, part of the at least one connection conductor disposed between the opposed surface and the fixing body first surface; and
        fixing legs that protrude from the opposed surface, that are associated with the respective fixing holes, and that have the part of the at least one connection conductor interposed between the fixing legs, and
    the fixing legs are capable of plastic deformation by an external force, are inserted in the respective fixing holes from a side of the fixing body first surface to protrude from a side of the fixing body second surface, and, under a fixed condition in which the at least one connection conductor is fixed to the fixing body by the fixing member, have leading ends disposed on an outside in a radial direction with respect to the fixing holes as viewed in an axial direction of the fixing holes.

2. The conductor module according to claim 1, wherein
    the at least one connection conductor includes at least one connection conductor having through holes that pass through a conductor first surface and a conductor second surface opposite to the conductor first surface and that are associated with the respective fixing holes, and
    the fixing legs are inserted in the through holes and the fixing holes under the fixed condition.

3. The conductor module according to claim 2, wherein
    the at least one connection conductor includes:
        a first connection conductor; and
        a second connection conductor different from the first connection conductor, and
    the second connection conductor is fixed, using the fixing member that fixes the first connection conductor, to the fixing body that is identical to the fixing body to which the first connection conductor is fixed.

4. The conductor module according to claim 3, wherein
    the connection target is a battery cell, and
    the conductor module further comprises:
    a status detector including a detection conductor that electrically connects the second connection conductor with a status detection unit that detects a status of the battery cell with which the second connection conductor is electrically connected.

* * * * *